(12) United States Patent
Novak (10) Patent No.: US 8,564,451 B2
(45) Date of Patent: Oct. 22, 2013

(54) EQUIPMENT AND METHOD FOR CONTROLLING A WIRELESS COMMUNICATION TERMINAL

(75) Inventor: Yaroslav Novak, Hattersheim (DE)

(73) Assignee: Motorola Solutions, Inc., Schaumburg, IL (US)

( * ) Notice: Subject to any disclaimer, the term of this patent is extended or adjusted under 35 U.S.C. 154(b) by 610 days.

(21) Appl. No.: 12/521,795

(22) PCT Filed: Oct. 31, 2007

(86) PCT No.: PCT/US2007/083111
§ 371 (c)(1),
(2), (4) Date: Nov. 2, 2010

(87) PCT Pub. No.: WO2008/085589
PCT Pub. Date: Jul. 17, 2008

(65) Prior Publication Data
US 2011/0169652 A1    Jul. 14, 2011

(30) Foreign Application Priority Data
Jan. 4, 2007   (GB) .................................. 0700117.5

(51) Int. Cl.
*G08B 21/00*  (2006.01)

(52) U.S. Cl.
USPC ...................... 340/686.6; 340/691.2; 340/5.21

(58) Field of Classification Search
USPC ............. 340/686.6, 691.2, 691.5, 691.6, 692, 340/5.21, 5.32
See application file for complete search history.

(56) References Cited

U.S. PATENT DOCUMENTS

| 4,954,817 | A | * | 9/1990 | Levine .......................... 345/179 |
| 5,715,834 | A | | 2/1998 | Bergamasco et al. |
| 5,805,144 | A | * | 9/1998 | Scholder et al. ............... 345/163 |
| 6,811,088 | B2 | | 11/2004 | Lanzaro |
| 7,098,776 | B2 | * | 8/2006 | Chang et al. ................ 340/407.1 |
| 7,842,879 | B1 | * | 11/2010 | Carter ............................. 84/730 |
| 2005/0052412 | A1 | | 3/2005 | McRae et al. |
| 2005/0269403 | A1 | * | 12/2005 | White et al. ................... 235/381 |

(Continued)

FOREIGN PATENT DOCUMENTS

| CA | 2465546 A1 | 5/2004 |
| EP | 0607926 B1 | 1/1994 |
| WO | WO02089325 A1 | 11/2002 |
| WO | WO2006115347 A1 | 11/2006 |

OTHER PUBLICATIONS

GB Rejection Dated Feb. 24, 2009.
GB Rejection Dated May 22, 2007.

(Continued)

*Primary Examiner* — Daniel Previl
(74) *Attorney, Agent, or Firm* — Valerie M. Davis; Daniel R. Bestor (57) ABSTRACT

A sensor pad (105) is adapted to be worn and operated by a user (100) to control a separate wireless communication terminal (103) carried by the user. The sensor pad includes a plurality of discrete sensors each operable to produce an indication signal indicating proximity of a user's finger to the sensor and a controller, responsive to receipt of indication signals from a plurality of the sensors, to produce a control signal for delivery to the wireless communication terminal to produce selection of a functional operation of the wireless communication terminal. Also described is a terminal for use with the sensor pad and also equipment and a method of operation.

19 Claims, 6 Drawing Sheets

(56) References Cited

U.S. PATENT DOCUMENTS

| | | |
|---|---|---|
| 2006/0056655 A1 | 3/2006 | Wen |
| 2007/0257890 A1 | 11/2007 | Hotelling et al. |
| 2008/0167535 A1* | 7/2008 | Stivoric et al. ............ 600/301 |

OTHER PUBLICATIONS

PCT Search Report Dated May 13, 2008.

"Kenpo Jacket with iPod controls—Review," accessed at http://www.ubergizmo.com/15/archives/2006/01/kenpo_jacket_with_ipod_controls_review.html, accessed on Jul. 24, 2012.

International Preliminary Report on Patentability and Written Opinion for counterpart International Patent application No. PCT/US2007/083111 mailed on Jul. 16, 2009.

Office Action Dated Jul. 22, 2013 for Related Continuation U.S. Appl. No. 13/861,887.

* cited by examiner

EQUIPMENT AND METHOD FOR CONTROLLING A WIRELESS COMMUNICATION TERMINAL

CROSS REFERENCE TO RELATED APPLICATIONS

This application is a National Stage filing under 35 USC §371 of co-pending Patent Cooperation Treaty international application having Serial No. PCT/US07/83111 (the "PCT international application") filed on Oct. 31, 2007. This application claims priority to the PCT international application and to prior Great Britain (GB) national application having Serial No. 0700117.5 filed on Jan. 4, 2007, the priority of which was also claimed in the PCT international application. Both the PCT international application and the GB national application are assigned to Motorola, Inc.

TECHNICAL FIELD

The technical field relates to equipment and a method for controlling a wireless communication terminal. In particular, the invention relates to a sensor pad for controlling a portable wireless communication terminal and a method of operation.

BACKGROUND

Portable wireless communication terminals used by professional users such as members of public safety organisations are becoming smaller and more compact, and the operational functions of such terminals are becoming increasingly varied to suit the needs of the user organisation. However, currently developing designs of such terminals have little regard to the fact that users sometimes have restricted ability to operate the terminals. For example, terminals carried by fire fighters or police officers may be difficult to operate when the user has restricted use of the hands in an operational situation.

SUMMARY

According to the present invention in a first aspect there is provided a sensor pad as defined in claim 1 of the accompanying claims.

According to the present invention in a second aspect there is provided equipment as defined in claim 11 of the accompanying claims.

According to the present invention in a third aspect there is provided a wireless communication terminal as defined in claim 14 of the accompanying claims.

According to the present invention in a fourth aspect there is provided equipment as defined in claim 15 or claim 16 of the accompanying claims.

According to the present invention in a fifth aspect there is provided a method as defined in claim 17 of the accompanying claims.

Further features of the invention are as defined in the accompanying dependent claims and are disclosed in the embodiments of the invention to be described.

Embodiments of the present invention will now be described by way of example with reference to the accompanying drawings.

BRIEF DESCRIPTION OF THE DRAWINGS

The accompanying drawings, in which like reference numerals refer to identical or functionally similar elements throughout the separate views and which together with the detailed description below are incorporated in and form part of the specification, serve to further illustrate various embodiments and to explain various principles and advantages all in accordance with the present invention.

Persons skilled in the art will appreciate that elements in the accompanying drawings are illustrated for simplicity and clarity and have not necessarily been drawn to scale. For example, the dimensions of some of the elements in the drawings may be exaggerated relative to other elements to help to improve understanding of embodiments of the present invention.

DESCRIPTION OF EMBODIMENTS OF THE INVENTION

Before describing in detail embodiments that are in accordance with the present invention, it should be observed that the embodiments reside primarily in combinations of method steps and apparatus components related to a method and equipment for controlling a wireless communication terminal. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for controlling a wireless communication terminal described herein. The non-processor circuits may include, but are not limited to, a radio receiver, a radio transmitter and user input devices. As such, these functions may be interpreted as steps of a method to perform the controlling of a wireless communication terminal described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Those skilled in the art will recognize and appreciate that the specifics of the illustrative examples of embodiments of the invention to be described with reference to the accompanying drawings are not specifics of the invention itself and that the teachings set forth herein in the embodiments are applicable in a variety of alternative settings.

Figure 1:
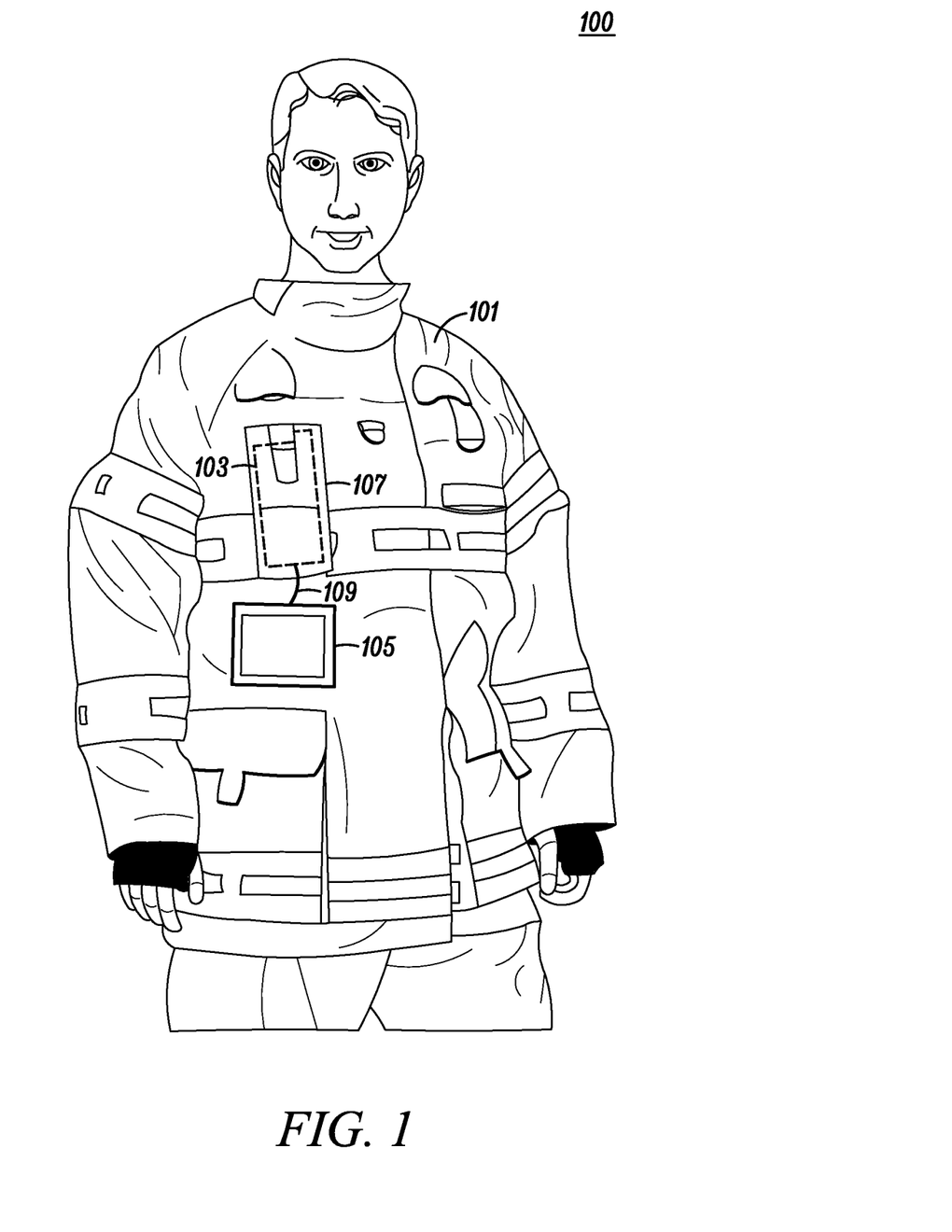
FIG. 1 is a front view of a user wearing a jacket carrying illustrative equipment for wireless communication in accordance with an embodiment of the invention.

FIG. 1 is a front view depicting a user 100 wearing a jacket 101 carrying illustrative equipment for wireless communication embodying the invention. The user 100 shown in FIG. 1 may for example be a person who is a fire fighter or has another hazardous occupation in which use of the user's hands is likely to be restricted in some situations. The wireless communication equipment comprises a portable wireless communication terminal 103 and a sensor pad 105. The wireless communication terminal 103 may be carried in a pocket of the jacket 101, e.g. a breast pocket 107 as shown in FIG. 1. The wireless communication terminal 103 could alternatively be attached to the jacket 101, e.g. by one of the attachment mechanisms well known in the art, e.g. having a holding member permanently attached to the jacket 101 and a fastener permanently attached to the wireless communication terminal 103 which releasably engages the holding member to carry the wireless communication terminal 103.

The sensor pad 105 allows controlling of the wireless communication terminal 103 by the user 100 when the user 100 has restricted use of the hands. The sensor pad 105 is described in more detail with reference to FIGS. 2 to 5.

The sensor pad 105 sends control signals to the wireless communication terminal 103. The control signals may be sent via a wired or cable connection 109 between the sensor pad 105 and the wireless communication terminal 103. Alternatively, there may be a short range wireless communication link between the sensor pad 105 and the wireless communication terminal 103 via which the sensor pad 105 may send control signals to the wireless communication terminal 103. For example, a short range wireless communication link may be established by use of a known short range wireless communication protocol.

This may for example be the protocol defined by the Bluetooth® standard, which is the open wireless communication terminal standard defined by the Bluetooth Consortium and Promotion Group. This standard is also known by the name IEEE (Institute of Electrical and Electronics Engineers) standard 802.15.1. Alternatively, the protocol of the short range link may be a Wireless Local Area network protocol in accordance with the 802.11 standard defined by the IEEE. Alternatively, the protocol may be the Zigbee™ protocol defined by the Zigbee Alliance in accordance with the 802.15.4 standard defined by the IEEE.

The sensor pad 105 may be permanently attached to the jacket 101 e.g. by sewing or permanent chemical or physical bonding, and may be exposed on the outer surface of the jacket 101 to be ready to be operated by the user 100. Alternatively, depending on how the sensor pad 105 operates, the sensor pad 105 may be located in a pocket or other holder permanently attached to the jacket 101. In this case, the sensor pad 105 may be operable by a user even when inside the pocket or holder. Such a pocket or holder may be made of a thin material, e.g. a plastics material, to facilitate operation by the user 100 of the sensor pad 105.

In any case, the sensor pad 105, or a pocket or holder in which it is held, may have a feel which is different from that of the front surface of the jacket 101, e.g. a rougher or smoother surface texture, so that the sensor pad 105 can be located easily by the fingers of the user 100.

Furthermore, the sensor pad 105 may be located at a position on the jacket 101 which allows the sensor pad 105 to be easily operated by the user's hand without bending of the user's body. For example, as illustrated in FIG. 1, the sensor pad 105 may be located on the front of the jacket 101 at a side adjacent to an elbow of the user 100, e.g. a right elbow where the user 100 is right handed.

Figure 2:
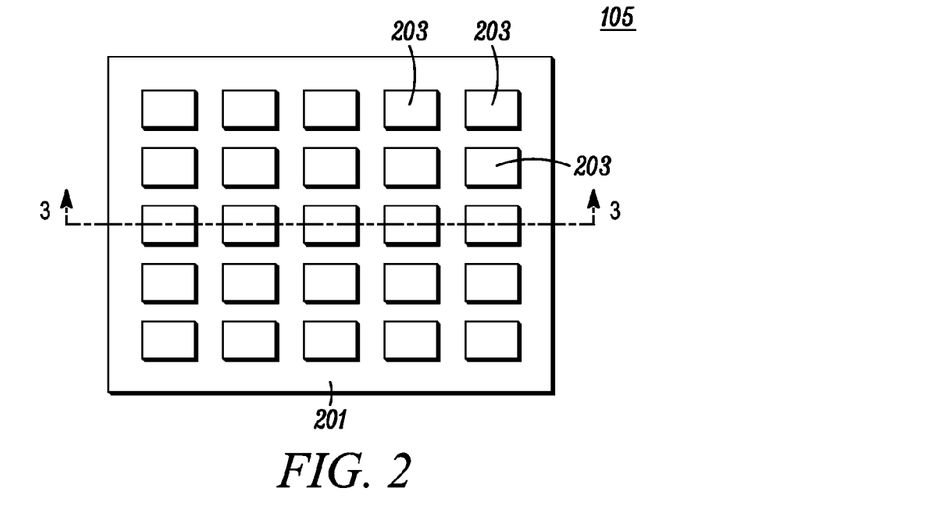
FIG. 2 is a front view showing more detail of a sensor pad embodying the invention attached to the jacket shown in FIG. 1.

FIG. 2 shows a front view of the sensor pad 105 illustrating more detail of the sensor pad 105. The sensor pad 105 includes a substrate 201 in which a grid or matrix of individual sensors 203 is incorporated. Each of the sensors 203 may be embedded in the substrate 201. Examples of suitable sensors for use as the sensors 203 are given below.

The substrate 201 may be flexible, e.g. made of an organic polymeric material such as a tough and flexible plastics material. The substrate 201 may be formed from a single piece of material, e.g. moulded material. Alternatively, it may be formed from multiple pieces of material, e.g. it may be made of a woven material. Where the substrate 201 comprises a woven material, strands of the material from which the woven material is made may conveniently be sewn into the jacket 101 to bind the sensor pad 105 to the jacket 101.

Figure 3:
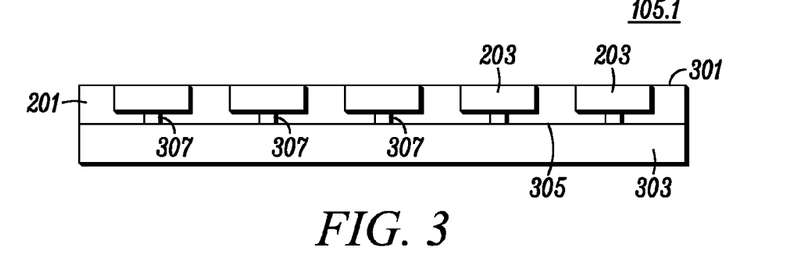
FIG. 3 is an example of a transverse cross-section through the sensor pad of FIG. 2 in a first example of the sensor pad.

FIG. 3 shows a first example 105.1 of the sensor pad 105 in cross-section in a plane indicated by a line 3-3 shown in FIG. 2. In the example 105.1, the sensors 203 are embedded in the substrate 201 adjacent to a front face 301 of the substrate 201. A controller 303 is attached to a rear face 305 of the substrate 201. Conductors 307 deliver signals between each of the sensors 203 and the controller 303.

Figure 4:
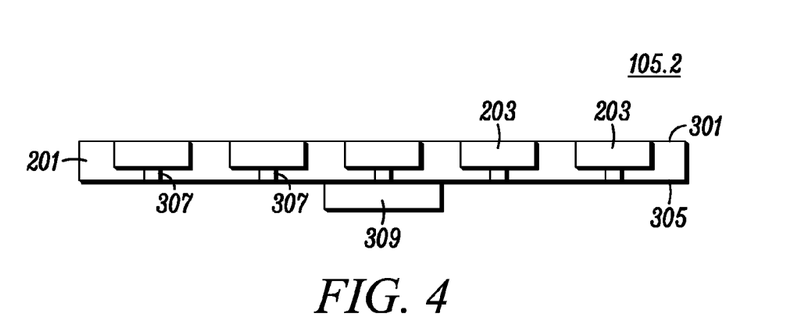
FIG. 4 is an example of a transverse cross-section through the sensor pad of FIG. 2 in a second example of the sensor pad.

FIG. 4 shows a second example 105.2 of the sensor pad 105 in cross-section in the plane indicated by line 3-3 shown in FIG. 2. In the example 105.2, the controller 303 shown in FIG. 2 is replaced by a smaller controller 309 which occupies only part of the rear face 305 of the substrate 201. In this case, the conductors 307 connected to some of the sensors 203 extend across the rear face 305 of the substrate 201 to reach the controller 309. On the rear face 305, the conductors 307 may be provided as printed metallization strips in a known manner.

Figure 5:
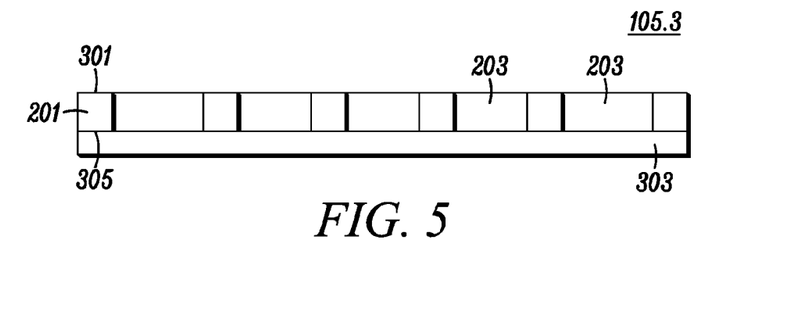
FIG. 5 is an example of a transverse cross-section through the sensor pad of FIG. 2 in a third example of the sensor pad.

FIG. 5 shows a third example 105.3 of the sensor pad 105 in cross-section in a plane indicated by the line 3-3 shown in FIG. 2. In the example 105.3, the sensors 203 extend between the front face 301 and the rear face 305 and are thereby able to contact the controller 303 directly without use of the intermediate conductors 307.

Each of the sensors 203 in each of the examples illustrated in FIGS. 2 to 5 may individually produce an indication signal to indicate that it has been activated by touching, pressing or proximity of a user's finger. Each of the sensors 203 may comprise one of the following options:

(i) an electro-mechanical actuator which operates by being pressed by a user's finger;

(ii) a device which produces a change in an electrical property, such as electrical conductivity, in a pressure sensitive material in a known manner when pressed by a user's finger;

(iii) a device which produces a change in an electrical property, e.g. capacitance, in a known manner when it senses touch of a user's finger;

(iv) a device which detects the presence of a complementary device carried by a user's finger, e.g. on a glove worn by a user.

Examples of complementary devices which may be used in option (iv) include:

(a) a radiation source and a corresponding radiation detector; for example, the radiation source may be a light or infrared source such as a light emitting diode and the corresponding radiation detector may be a photodetector such as a photoconductive sensor;

(b) a device producing a magnetic field such as a permanent magnet and a detector which detects the magnetic field, such as a Hall effect detector.

Hall effect detectors are well known per se. Typically, in such a detector, a transverse voltage is produced in a current carrying semiconductor in the presence of a magnetic field. Moreover typically, the output voltage increases by about 1.5 mV per gauss in the magnetic field. As a residual voltage (usually less than 1 mV) is produced by the earth's magnetic field, an output signal may be produced when the voltage produced by the presence of a magnet is above a suitable threshold, e.g. a threshold of at least about 10 mV. The magnetic flux produced at the Hall effect detector to provide a satisfactory detection may be at least about 10 gauss, in some cases at least about 100 gauss. Such a magnetic flux may be provided by a suitable small permanent magnet made of a ferromagnetic material such as iron.

Figure 6:
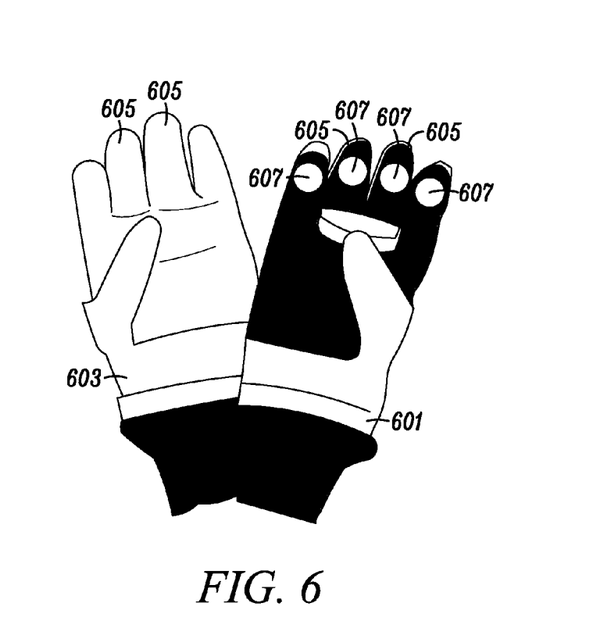
FIG. 6 is a front view of a pair of gloves that may be used in conjunction with the sensor pad of FIG. 2 in equipment embodying the invention.

FIG. 6 shows an illustrative pair of gloves that may be worn by the user 100 in conjunction with the jacket 101 carrying the sensor pad 105. The pair of gloves includes a right hand glove 601 and a left hand glove 603. Each of the gloves 601 and 603 has finger compartments 605. On at least one of the gloves 601 and 603, at least one device 607 is attached to one of the finger compartments 605 on its front outer face. FIG. 6 shows devices 607 on each of the finger compartments 605 of the glove 601. Each device 607 may be adjacent to a position of a finger compartment 605 covering a tip of the user's finger when inside the compartment 605. The devices 607 are complementary to the sensors 203 of the sensor pad 105. For example, where the sensors 203 comprise Hall effect detectors, the devices 607 may comprise small permanent magnets.

The devices 607 shown in FIG. 6 are on the finger compartments 605 of the right hand glove 601 for use by a right handed user. Alternatively, or in addition, the devices 607 may be on the finger compartments 607 of the left hand glove 603 for use by a left handed user.

Each of the devices 607 may be attached to an appropriate finger compartment 605 in a known manner, e.g. by bonding by a suitable adhesive such as a cured cross-linked polymeric material.

The user 100 may operate the sensor pad 105 when using the gloves 601 and 603 including the devices 607 in the following way. Each of the devices 607 when brought close to one of the sensors 203 activates that sensor 203 to produce an indication signal. By activating the sensors 203 in this way using the complementary devices 607 it is better ensured that the sensors 203 are operated intentionally and not accidentally, e.g. when a user collides with an obstacle in a working operation.

Figure 7:
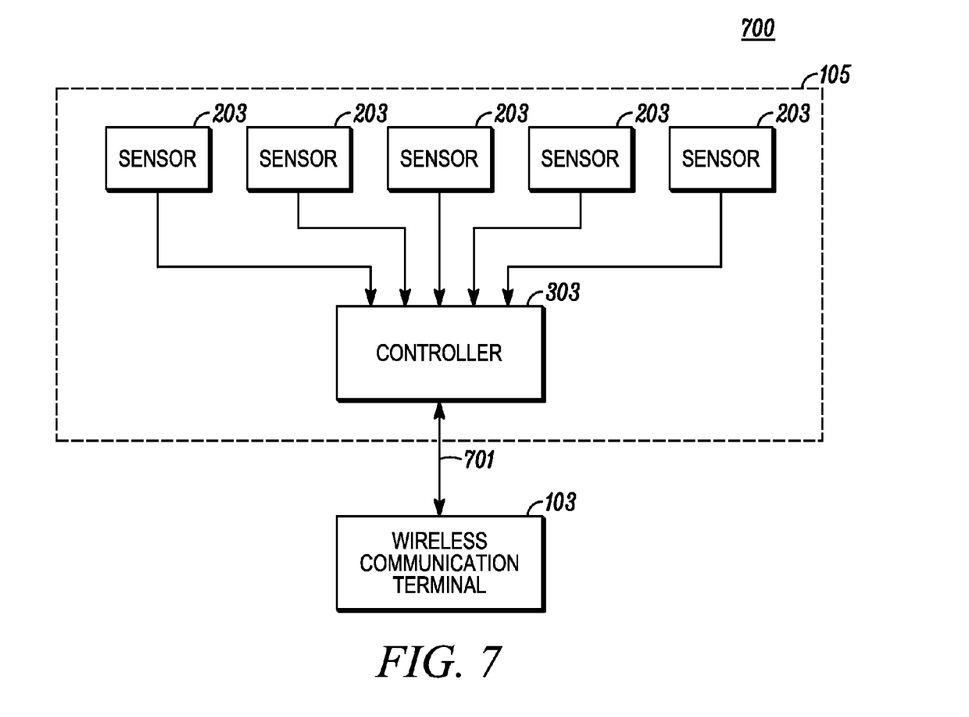
FIG. 7 is a block schematic diagram of equipment comprising the sensor pad of FIG. 2 and a wireless communication terminal in equipment embodying the invention.

FIG. 7 is a functional block schematic diagram of illustrative equipment carried by the user 100 comprising the sensor pad 105 and the wireless communication terminal 103. The equipment, indicated by reference numeral 700, includes the sensor pad 105 in which the sensors 203 are incorporated. Only one row of the sensors 203 is shown in FIG. 6 for simplicity. The sensors 203 are operably connected to the controller 303. The controller 303 detects when a particular plurality of the sensors 203 together or a particular sequence of the sensors 203 in turn have been activated to select a particular functional operation of the wireless communication terminal 103. For example, the controller 303 may detect indication signals from a given plurality of the sensors 203, e.g. a given horizontal, vertical or diagonal row of the sensors 203, or a given sequence of sensors 203, e.g. by activation of each of the sensors 203 in a given row of the sensors 203 in sequence. The particular sensors 203 which are required to be selected for activation by the user 100 to produce the required indication signals from the sensors 203 are known to the user, e.g. from explanatory information provided to the user 100 on use of the sensor pad 105.

Different control signals leading to different functional operations of the wireless communication terminal 103 may be selected by activation together of different pluralities of the sensors 203. For example, activation together of sensors 203 which are in a horizontal row of the sensors 203 may give a first control signal, activation together of sensors 203 which are in a vertical row of the sensors 203 may give a second control signal, and activation together of sensors 203 which are in a diagonal row of the sensors 203 may give a third control signal.

The same control signal may be produced by the controller 303 by the user 100 selecting any one of a plurality of similar rows of the sensors 203 for activation. For example, a first control signal may be produced by activation together of any horizontal row of the sensors 203, and a second control signal may be selected by activation together of any vertical row of the sensors 203.

Alternatively, or in addition, different control signals may be produced by activation of different selected sequences of sensors 203. For example activation of each of the sensors 203 which are in a horizontal row of the sensors 203 in turn may give a first control signal, activation of each of the sensors 203 which are in a vertical row of the sensors 203 in turn may give a second control signal, and activation of each of the sensors 203 which are in a diagonal row of the sensors 203 in turn may give a third control signal.

Different control signals may be produced by activation of the same plurality of sensors 203 in different orders. For example, if each of the sensors 203 in a horizontal row of the sensors 203 is activated in sequence from left to right this may give a first control signal, and if each of the sensors 203 in the same horizontal row is activated in sequence from right to left this may give a second control signal. Similarly, if each of the sensors 203 in a vertical row of the sensors 203 is activated in sequence from a lower to a higher position this may give a first control signal, and if each of the sensors 203 in the same vertical row is activated in sequence from a higher position to a lower position, this may give a second control signal.

When indication signals from an appropriate plurality and/or sequence of the sensors 203 have been detected by the controller 303, the controller 303 generates and sends to the wireless communication terminal 103 a corresponding control signal to produce operation of a selected function corresponding to the plurality and/or sequence of sensors 203 which have been selected by the user 100. Each control signal sent by the controller 303 may be a signal indicating which of the sensors 203 have been activated and, where appropriate, a sequence in which the particular sensors 203 have been activated. This may be a data signal in which fields of the data represent different identifiers relating to the activated sensors 203. Each control signal produced by the controller 303 may be sent to the wireless communication terminal 103 via a link 701 which may be provided by the wired or cable connection 109 shown in FIG. 1 or may be a short range wireless link operating according to one of the protocols referred to earlier. The control signals sent to the wireless communication terminal 103 may be interpreted by the wireless communication terminal 103 in a manner described later.

Signals may also be sent from the wireless communication terminal 103 to the controller 303 via the link 701, e.g. to initiate activation of the controller 303.

Figure 8:
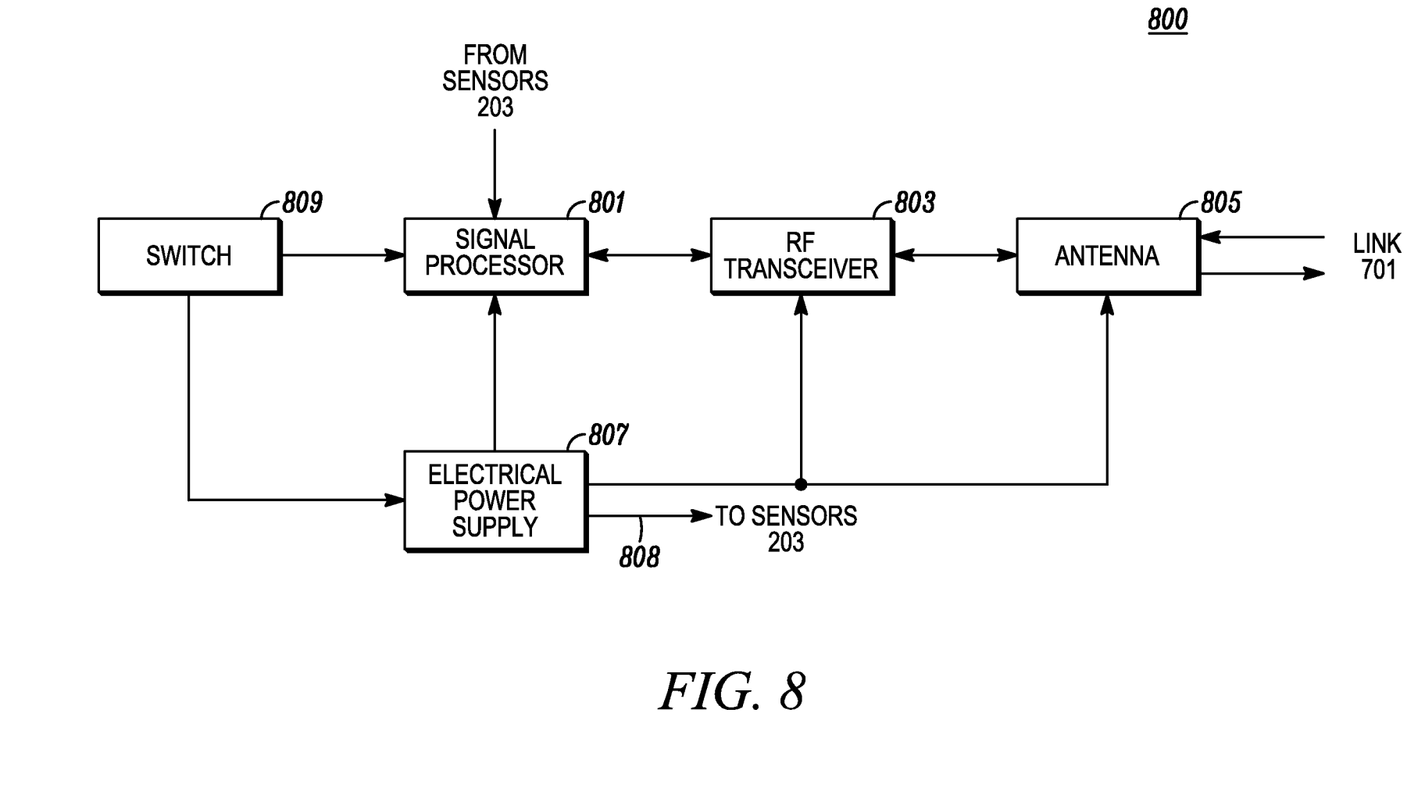
FIG. 8 is a block schematic diagram of an illustrative controller of the sensor pad of FIGS. 2 to 5.

FIG. 8 is a block schematic diagram of an illustrative arrangement 800 of functional components in the controller 303. The arrangement 800 includes a processor 801 and, operably connected together in turn, an RF transceiver 803 and an antenna 805, e.g. having a known compact form such as a planar form. The processor 801 receives indication signals from the sensors 203 and carries out signal processing operations including detection of the indication signals from the sensors 203 as well as associated determinations, e.g. of which sensors 203 sent the indication signals. The signal processor 801 may also determine that the indication signals are from a selected row of the sensors 203 or from selected sensors 203 in sequence. Output control signals produced by the processor 801 are delivered to the RF transceiver 803 which produces corresponding RF signals to be sent from the antenna 805 via the link 701 to the wireless communication terminal 103. Signals may also be received from the terminal 103, e.g. to initiate activation of the controller 303.

The arrangement 800 may include an electrical power supply 807, e.g. a battery which provides electrical power to the components of the arrangement 800 and optionally also to the sensors 203 if required, as indicated by an arrow 808. A manually operated switch 809 connected to the electrical power supply 807 allows selective energisation and de-energisation by the user 100 of components of the arrangement 800 and optionally the sensors 203.

Figure 9:
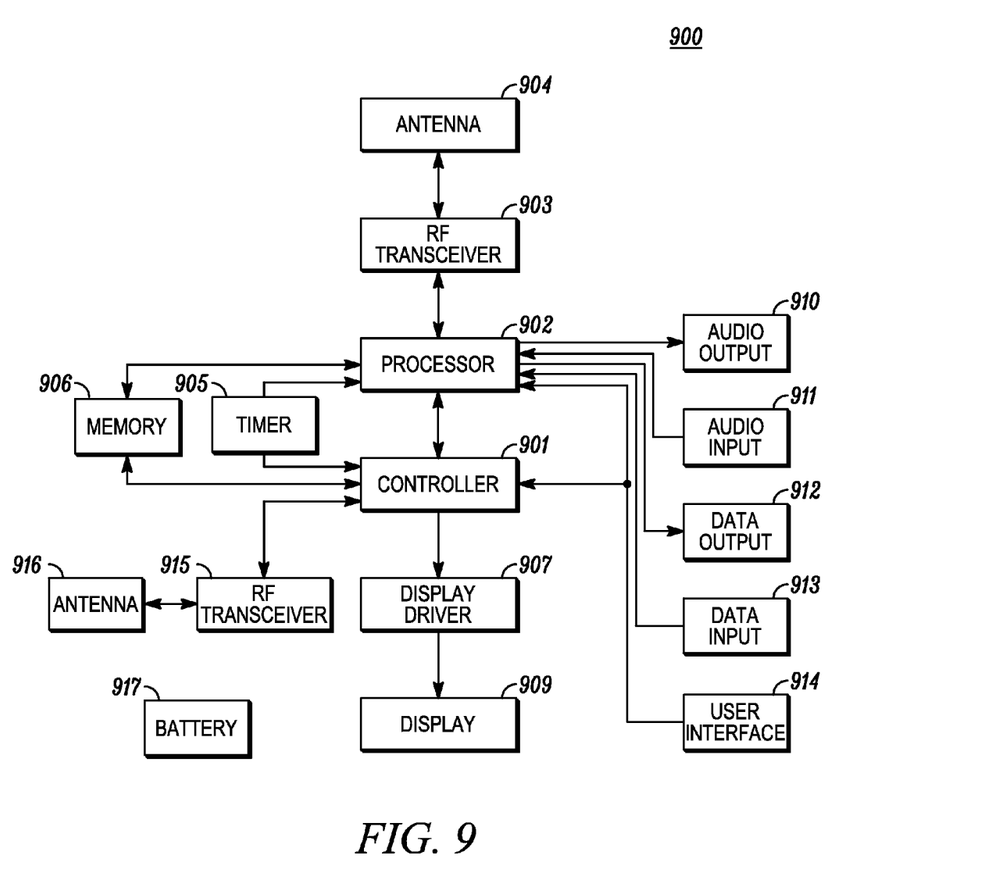
FIG. 9 is a block schematic diagram of an illustrative wireless communication terminal embodying the invention for use in the equipment shown in FIG. 1 and FIG. 8.

FIG. 9 shows an illustrative layout 900 of functional components of the wireless communication terminal 103. A controller 901 controls functional operations of the wireless communication terminal 103. A processor 902 operably connected to the controller 901 processes information sent to and from the wireless communication terminal 103. The controller 901 and the processor 902 are operably connected to a timer 905 that provides operational synchronisation and timing and to a memory 906 that stores data and programs needed in operation by the controller 901 and the processor 902.

The processor 902, which may for example comprise a digital processor, which could be included with the controller 901 in a common digital signal processing unit, is operably connected to an RF transceiver 903. The RF transceiver 903 transmits and receives RF signals including signals carrying information sent to and from the wireless communication terminal 103 having the layout 900. The signals are delivered over-the-air to and from the antenna 904 connected to the RF transceiver 903. The signals sent from and received by the RF transceiver 903 via the antenna 904 are signals sent to or from one or more remote terminals (not shown) with which the wireless communication terminal 103 is communicating by a main communication protocol, e.g. a protocol of a trunked communication system such as one operating in accordance with the TETRA or APCO 25 standard. The wireless communication terminal may be operating in a trunked or direct mode in such a system.

An RF transceiver 915 and an antenna 916 are included in the layout 900 where the link 701 (FIG. 7) is a short range wireless link. The RF transceiver 915 transmits and receives short range RF signals, including control signals sent to the wireless communication terminal 103 having the layout 900, by the controller 303 (FIG. 7). The RF signals are delivered via the link 701 to and from the antenna 916 connected to the RF transceiver 915. The signals sent and received by the RF transceiver 915 via the antenna 916 may be encrypted signals sent by a short range communication protocol, e.g. one of the short range protocols referred to earlier.

The RF transceiver 915 is operably connected to the controller 901. When an input RF signal is received from the controller 303 (FIG. 7) via the link 701, the RF transceiver 915 receives the signal and produces a corresponding electrical control signal which is delivered to the controller 901. The controller 901 interprets the received signal as an instruction to execute a corresponding operational function. This interpretation may be assisted by reference to a mapping or lookup table held in the memory 906 which maps different received control signals against operations represented by the signals. The controller 901 thereby interprets the received signal as an instruction to select a particular functional operation corresponding to the information provided in the signal and proceeds to execute the indicate instruction accordingly, for example by further use of an operational program or data retrieved from the memory 906.

Examples of functional operations of the wireless communication terminal 103 which may be executed by the controller 901 by interpretation of control signals from the controller 303 of the sensor pad 105 may include any of the following operations (which are operations known per se):

(i) operation of a switch equivalent to a PTT (push to talk) switch to initiate a call;
(ii) selection of a call channel;
(iii) selection of a particular call group;
(iv) scrolling through a list of possible options, e.g. a list of possible channels or call groups.

When the RF transceiver 903 via the antenna 904 receives an RF signal from a remote terminal including information representing communicated speech, the processor 902 extracts the speech information and delivers a signal including the extracted speech information to an audio output 910 which comprises a transducer such as a speaker which converts the signal to audio form to reconstruct the communicated speech for the user 100 of the wireless communication terminal 103. The wireless communication terminal 103 having the arrangement 900 also includes an audio input 911 which comprises a transducer such as a microphone which converts speech of the user 100 into the form of an electrical signal and delivers the signal to the processor 902 which processes the signal into a form suitable for inclusion in an RF signal for transmission by the RF transceiver 903 via the antenna 904.

When the RF transceiver 903 receives via the antenna 904 a signal representing communicated (non-speech) data, e.g. alphanumeric characters representing words or numerals or picture, image or video information, the processor 902 extracts information relating to the communicated data and delivers a signal including the extracted data to a data output 912. The data output 912 may for example comprise a connector which can be connected to an external data processing terminal (not shown), e.g. a personal computer.

A data input 913 provides an input signal from a user including data to be communicated. The data input 913 may for example comprise a connector which may be connected to a data source, e.g. a personal computer (not shown) e.g. at a time when the terminal 103 may be used in a normal use mode without use of the controller 303. The signal provided by the data input 913 is delivered to the processor 902 which processes information included in the signal into a form suitable for inclusion in an RF signal to be transmitted by the RF transceiver 903 via the antenna 904.

The wireless communication terminal 103 having the layout 900 includes a user interface 914, e.g. a keypad and control buttons, which allows a user to enter instructions and data into the mobile station during a normal use mode, i.e. use without the sensor pad 105. The user interface 914 is operably connected to the controller 901 to receive signals representing instructions entered by a user at the user interface 914. The user interface 914 is also operably connected to the processor 902 to enable a signal representing data entered by the user at the user interface 914 to be delivered to the processor 902. The processor 902 processes data included in the signal into a form suitable for inclusion in an RF signal to be transmitted by the RF transceiver 903 via the antenna 904.

The wireless communication terminal 103 having the layout 900 may include a display 909 operable to display information to a user in a known manner during normal use, e.g. when the terminal 103 is held in a hand of the user 100 in a normal use mode. The display 909 may be driven by a display driver 907 under control of the controller 901.

A battery 917 (or other known portable electrical energy source) provides a source of electrical energy for all active components of the wireless communication terminal 103 in the layout 900.

As indicated above, as well as providing operations which are controlled by the controller 303 of the sensor pad 105, the wireless communication terminal 103 may provide operations in a known manner without control by the controller 303 of the sensor pad 105, particularly when the user 100 is able to use the wireless communication terminal 103 in a normal safe environment. Thus, the terminal 103 may operate in one of two modes selected by the user 100, e.g. via the user interface 914, namely a normal use mode in which there is no involvement of the controller 303, and a remotely controlled mode in which the controller 303 of the sensor pad 105 controls operations of the terminal 103.

Figure 10:
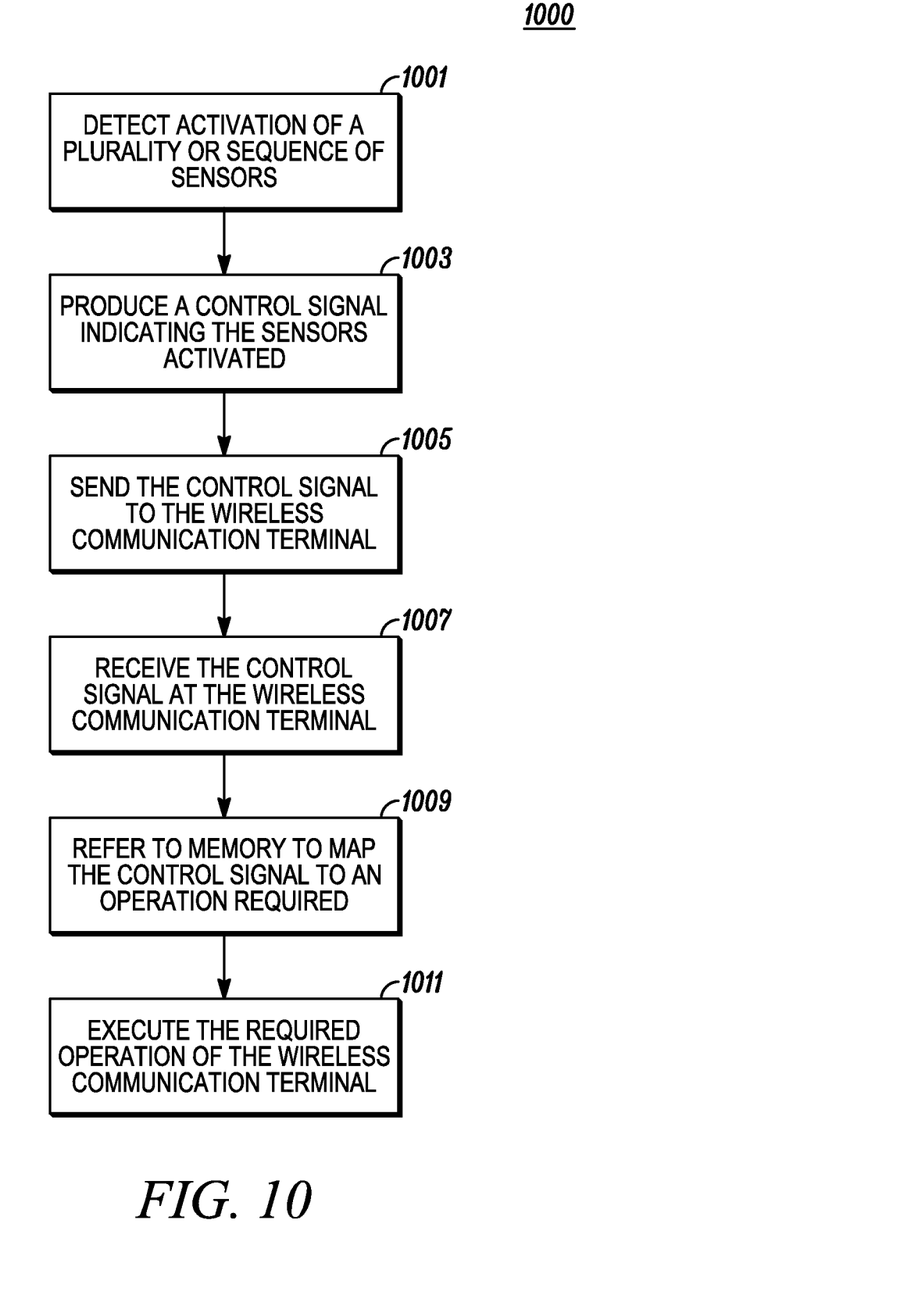
FIG. 10 is a flow chart of a method embodying the invention for use in the equipment shown in FIG. 1 and FIG. 9.

FIG. 10 is a flow chart of a method 1000 summarising operation in the equipment 700. In a step 1001, the controller 303 of the sensor pad 105 detects activation of a selected plurality or sequence of sensors 203 of the sensor pad 105. In a step 1003, the controller 303 produces a control signal indicating the particular plurality or sequence of sensors 203 that have been activated. In a step 1005, the control signal produced by the controller 303 in step 1003 is sent to the wireless communication terminal 103 via the link 701. In a step 1007, the control signal sent by the controller 303 in step 1005 is received by the wireless communication terminal 103, e.g. in the layout 900 by the RF transceiver 915 via the antenna 916. A corresponding signal is then delivered to the controller 901 of the terminal 103 in the layout 900. In a step 1009, the terminal 103 refers to a memory, e.g. the controller 901 refers to the memory 906, to map the control signal received to a corresponding functional operation of the terminal 103 required. The memory may include a lookup or mapping table of operations indicated by different control signals. Finally, in a step 1011, the terminal 103, e.g. by the controller 901, executes the required operation of the wireless communication terminal 103 determined to have been indicated by the control signal.

In the embodiments of the invention which have been described herein, the sensor pad 105 provides a convenient and beneficial means to transfer control signals entered by the user 100 at the sensor pad 105 remote from the wireless communication terminal 103 to operate the terminal 103, e.g. when the user 100 has restricted use of the hands. Thus, the restricted use of the hands of the user 100 does not prevent the user 100 from operating functions of the terminal 103, including important or essential functions associated with operating the terminal 103 in an emergency, by operating the control signals at the sensor pad 105. The sensor pad 105 may be worn by the user 100 at a position on the user's clothing, e.g. the jacket 101, which allows convenient operation by the user's fingers. Furthermore, the sensors 203 of the sensor pad 105 may beneficially be adapted to detect readily the touch or proximity of a user's finger, even when the user is wearing gloves, e.g. by use of complementary devices 607 on the gloves and in the sensors 203.

Furthermore, the wireless communication terminal which is operated may be maintained in a position on the user 100 which is convenient for use during difficult operations. For example, the position may be on the upper body of the user 100 allowing the user to speak into the terminal without moving the terminal during use.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected (and vice versa), although not necessarily directly and not necessarily mechanically. A device or structure that is "configured" in a certain way is configured in at least that way, but may also be configured in ways that are not listed.

The invention claimed is:

1. A sensor pad to be worn by a user and operated by the user to control a separate wireless communication terminal carried by the user, the sensor pad comprising:
   a plurality of discrete sensors each operable to produce an indication signal indicating proximity of the user's finger to the sensor;
   a controller configured to, responsive to receipt of indication signals from a plurality of the sensors, produce a control signal to control a function of the wireless communication terminal; and
   a flexible substrate holding the plurality of discrete sensors and the controller;
   wherein the sensors are operable to detect proximity of the user's fingers when adjacent to a first face of the flexible substrate and the controller is held adjacent to a second face of the flexible substrate.

2. The sensor pad according to claim 1, wherein the flexible substrate is made of a woven fabric material.

3. The sensor pad according to claim 2, wherein the woven fabric material is part of a jacket to be worn by the user.

4. The sensor pad according to claim 1, wherein the controller is operable to detect when a selected plurality of the sensors have produced an indication signal and to produce a control signal in response to the detection.

5. The sensor pad according to claim 4, wherein the controller is operable to produce different control signals when different selected pluralities of the sensors produce an indication signal.

6. The sensor pad according to claim 1, wherein the controller is operable to detect when each of a selected plurality of the sensors have produced an indication signal in sequence and to produce a control signal in response to the detection.

7. The sensor pad according to claim 1, wherein each of the sensors is selected from the following:
   (i) an electro-mechanical actuator which operates by being pressed by a user's finger;
   (ii) a device which produces a change in an electrical property of a pressure sensitive material when pressed by a user's finger;
   (iii) a device which produces a change in an electrical property when it senses touch of a user's finger; and
   (iv) a device which detects the presence of a complementary device carried by a user's finger.

8. The sensor pad according to claim 7, wherein each of the sensors is a device which detects the presence of a complementary device carried by a user's finger and the sensor and the complementary device is selected from:
   (a) a radiation source and a corresponding radiation detector; and
   (b) a device producing a magnetic field and a detector which is operable to detect the magnetic field.

9. The sensor pad according to claim 8, wherein each of the sensors comprises a Hall effect detector which is operable to detect a magnetic field produced by a corresponding magnet held by the user.

10. The sensor pad according to claim 1, further comprising a short range radio frequency (RF) transceiver for communicating with the wireless communication terminal.

11. A sensor pad to be worn by a user and operated by the user to control a separate wireless communication terminal carried by the user, the sensor pad comprising:
    a plurality of discrete sensors each operable to produce an indication signal indicating proximity of a complementary input device to the sensor;
    a controller configured to, responsive to receipt of indication signals from a plurality of the sensors produce a control signal to control a function of the wireless communication terminal; and
    a flexible substrate holding the plurality of discrete sensors and the controller;
    wherein the sensors are operable to detect proximity of the complementary input device when adjacent to a first face of the flexible substrate and the controller is held adjacent to a second face of the flexible substrate.

12. The sensor pad according to claim 11, wherein the complementary input device comprises a magnet and at least one of the plurality of discrete sensors comprises a Hall effect detector.

13. The sensor pad according to claim 11, wherein the complementary input device is disposed on an outer surface of at least one finger compartment of the at least one glove worn by the user.

14. The sensor pad according to claim 11, further comprising a short range radio frequency (RF) transceiver for communicating with the wireless communication terminal.

15. The sensor pad according to claim 11, wherein the flexible substrate is made of a woven fabric material.

16. The sensor pad according to claim 15, wherein the woven fabric material is part of a jacket to be worn by the user.

17. A method of manufacturing a sensor pad to be worn by a user and operated by the user to control a separate wireless communication terminal carried by the user, the method comprising:
    forming a plurality of discrete sensors at a first face of a flexible substrate, each sensor producing an indication signal indicating proximity of an input device to the sensor when the input device is adjacent the first face of the flexible substrate;
    disposing a controller at a second face of the flexible substrate that, responsive to receipt of indication signals from a plurality of the sensors, produces a control signal to control a function of the wireless communication terminal.

18. The method of claim 17, wherein the flexible substrate is made of a woven fabric material.

19. The method of claim 18, wherein the woven fabric material is part of a jacket to be worn by the user.

* * * * *